(12) United States Patent
Iltsenko et al.

(10) Patent No.: US 8,298,383 B2
(45) Date of Patent: Oct. 30, 2012

(54) CYLINDRICAL MEMBRANOUS ELECTROLYTIC CELL AND ASSEMBLED ANODE AND DIAPHRAGM

(76) Inventors: Valeri Iltsenko, Tallinn (EE); Nikolay Naida, Tallinn (EE)

( * ) Notice: Subject to any disclaimer, the term of this patent is extended or adjusted under 35 U.S.C. 154(b) by 823 days.

(21) Appl. No.: 12/428,962

(22) Filed: Apr. 23, 2009

(65) Prior Publication Data

US 2009/0266709 A1    Oct. 29, 2009

(30) Foreign Application Priority Data

Apr. 23, 2008    (EE) .................................. 200800023

(51) Int. Cl.
*C25B 9/08*    (2006.01)

(52) U.S. Cl. .......................... 204/260; 204/263; 204/272
(58) Field of Classification Search .................. 204/260, 204/272

See application file for complete search history.

(56) References Cited

U.S. PATENT DOCUMENTS

| 6,004,439 | A | * | 12/1999 | Bakhir et al. | ................. 204/260 |
| 2005/0183949 | A1 | * | 8/2005 | Daly et al. | ................... 204/242 |
| 2007/0272549 | A1 | * | 11/2007 | Davis et al. | ................... 204/260 |
| 2008/0264781 | A1 | | 10/2008 | Iltsenko et al. | |

FOREIGN PATENT DOCUMENTS

| EE | 200700021 A | 12/2008 |
| RU | 2104961 C1 | 2/1998 |
| RU | 2176989 C1 | 12/2001 |
| RU | 2248940 C1 | 3/2005 |

* cited by examiner

*Primary Examiner* — Harry D Wilkins, III
*Assistant Examiner* — Bryan D. Ripa
(74) *Attorney, Agent, or Firm* — Rader, Fishman & Grauer, PLLC

(57) ABSTRACT

The disclosure is directed to the area of electrochemical processing of liquids and production of gases, and is used for anolyte and catholyte synthesis. The electrolytic cell comprises an assembled anode and a diaphragm. Elements of the anode and the diaphragm are assembled in axial alignment with help of sleeves, and free ends of the anode and the diaphragm are fixed in a coaxial manner with solid of electrolyte input and output covers. The cathode is made solid from a single pipe with current terminals on each side. The cathode is the internal electrode of the electrolytic cell, while the anode is the external one. The anode is may be provided with a visual indicator as a positive electrode.

31 Claims, 7 Drawing Sheets

CYLINDRICAL MEMBRANOUS ELECTROLYTIC CELL AND ASSEMBLED ANODE AND DIAPHRAGM

CROSS REFERENCE TO RELATED APPLICATIONS

This application claims priority to Estonian Patent Application No. P200800023, filed on Apr. 23, 2007, which application is incorporated herein by reference in its entirety.

FIELD OF INVENTION

The invention relates generally to chemical technology, in particular to the area of electrochemical processing of liquids and production of gases, and is used for anolyte and catholyte synthesis.

BACKGROUND

From the technical and construction, known prior art includes: electrochemical installation—Russian patent RU2104961 [1] filed on Feb. 20, 1998, electrochemical cell for processing of water solutions, installation for production of anodic oxidation products, alkaline chloride solutions or alkali-earth metals—Russian patent RU2176989 [2] filed on Nov. 1, 2000, device for electrochemical processing of water and water solutions—Russian patent RU2248940 [3] filed on Jan. 16, 2004 and bicameral coaxial electrolytic cell device—Estonian patent application P200700021 [4] filed on Apr. 30, 2007.

There is a great demand for electrolytic cells with oxidant performance of 100 g/h and much more. For instance, such mass technology as decontamination of ballast water in ships requires the oxidant performance to be as high as 5000 g/h, and to maintain such performance for more than two years of use.

Electrolytic cells [1], [3] provide performance of 10 g/h each and there are no reliable ways to connect them into blocks of overall performance of more than 400 g/h. Electrolytic cells [2] provide performance of 40 g/h and [4] of 130 g/h and in certain situations up to 54 units may be hydraulically and electrically connected. One of the disadvantages of this solution is its lower reliability due to numerous hydraulic connections, complexity of the whole construction and high maintenance costs (including those related to removal of cathodic build-up). Therefore the common disadvantage of the listed electrolytic cells is their relatively low performance.

There are certain boundaries to enlarging the components' size in order to assemble them into a higher capacity and performance electrolytic cell, as it makes the manufacture process more expensive due to the need to use new and more expensive equipment and technologies, e.g. those for creation of protective anode layer or for manufacture of ceramic diaphragms.

SUMMARY

One of the aims of the present invention is to create a cylindrical electrolytic cell of significantly higher performance with coaxial electrodes and a diaphragm, that could be used for a long time under diverse external conditions: operation environment temperature, input and output pressure in electrolytic cell, processed liquid volume, rolling etc—without enlarging the limiting parts of the anode and the diaphragm.

This aim was reached through the electrolytic cell construction developed by the inventors of the construction on the basis of anode and diaphragm that are assembled in axial alignment to reach the necessary length by using the original joining sleeves. Also parts of the construction were developed to extend the functionality of electrolytic cells in the variable operation conditions: electrolytic cell terminals in the amount sufficient for stable warming up in the operation mode and under much smaller flow of electrolyte and electrolysis products; covers and joints with the channels for flow of electrolyte and electrolysis products, where the size and placement of channels provide for operation of the electrolytic cell with the declared performance with the input pressure of less than 1 bar; covers and joints with the direction of the flow of electrolyte and electrolysis products required in order to create and preserve the spiral movement of electrolyte inside the electrolytic cell (useful for both the efficiency of electrolysis and for operation of the electrolytic cell in rolling conditions); electrical and hydro isolation layers of the cover of the anode elements and the anode as such in order to protect the device from the destruction of external electrode.

DETAILED DESCRIPTION

Figure 1:
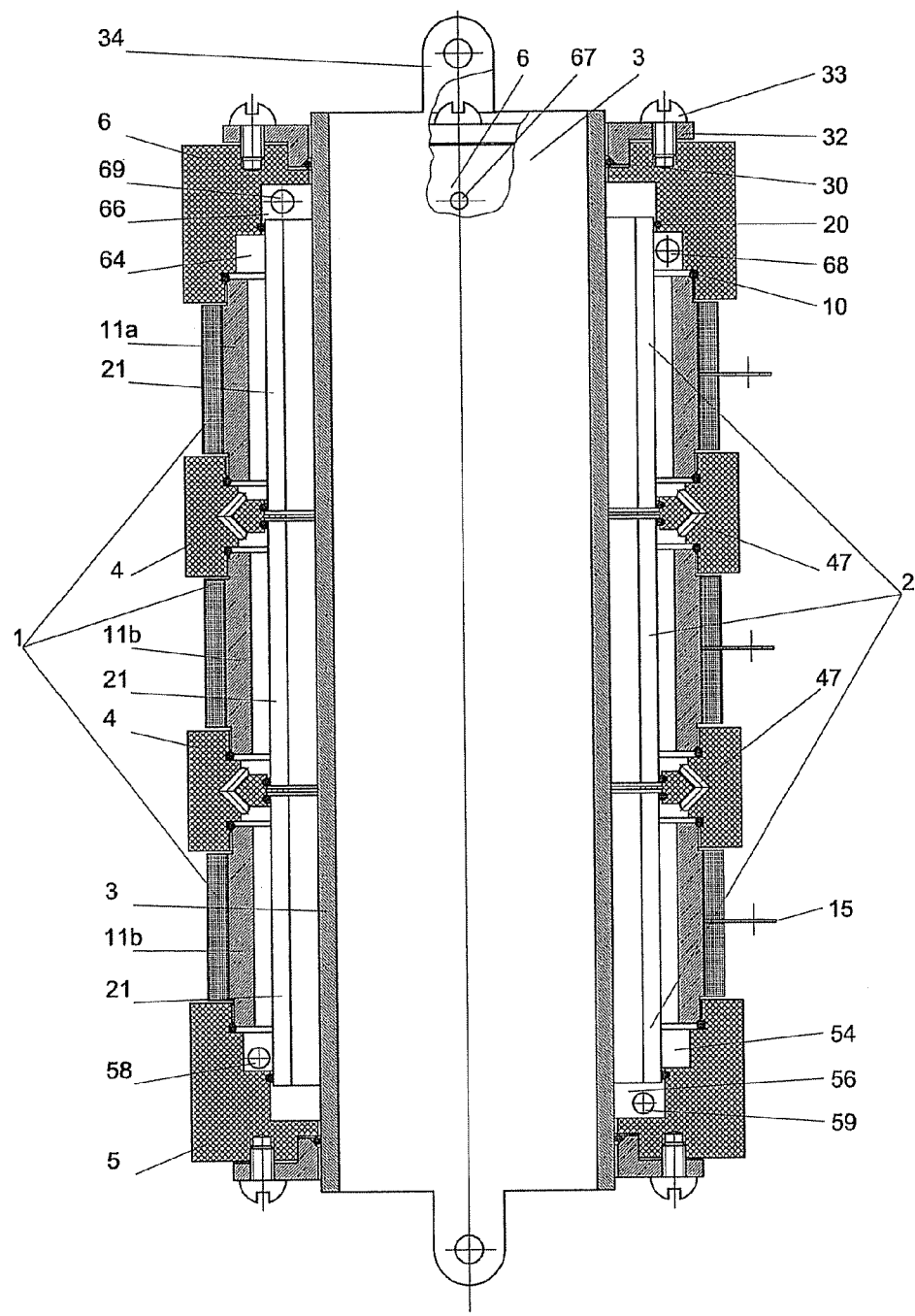
FIG. 1 demonstrates an exemplary electrolytic cell.

FIG. 1 demonstrates an exemplary embodiment of an electrolytic cell. The electrolytic cell comprises: a cylindrical anode 1 made of parts 11$a$ and 11$b$, a cylindrical diaphragm 2 made of parts 21, a cathode 3, joining sleeves 4, an input cover 5 with channels connecting electrode chambers and supplementary containers in the cover 5 with the environment, an output cover 6 with channels connecting electrode chambers and supplementary containers in the covers with the environment, gasket rings 10 for the parts of the anode, gasket rings 20 for parts of the diaphragm, gasket rings for the cathode 30, and flanges 32 and screws (33) required for sealing of the cathode.

Anode 1, diaphragm 2, and cathode 3 are arranged in a coaxial manner. Anode 1 is the external electrode, while cathode (3) is the internal one.

Figure 2:
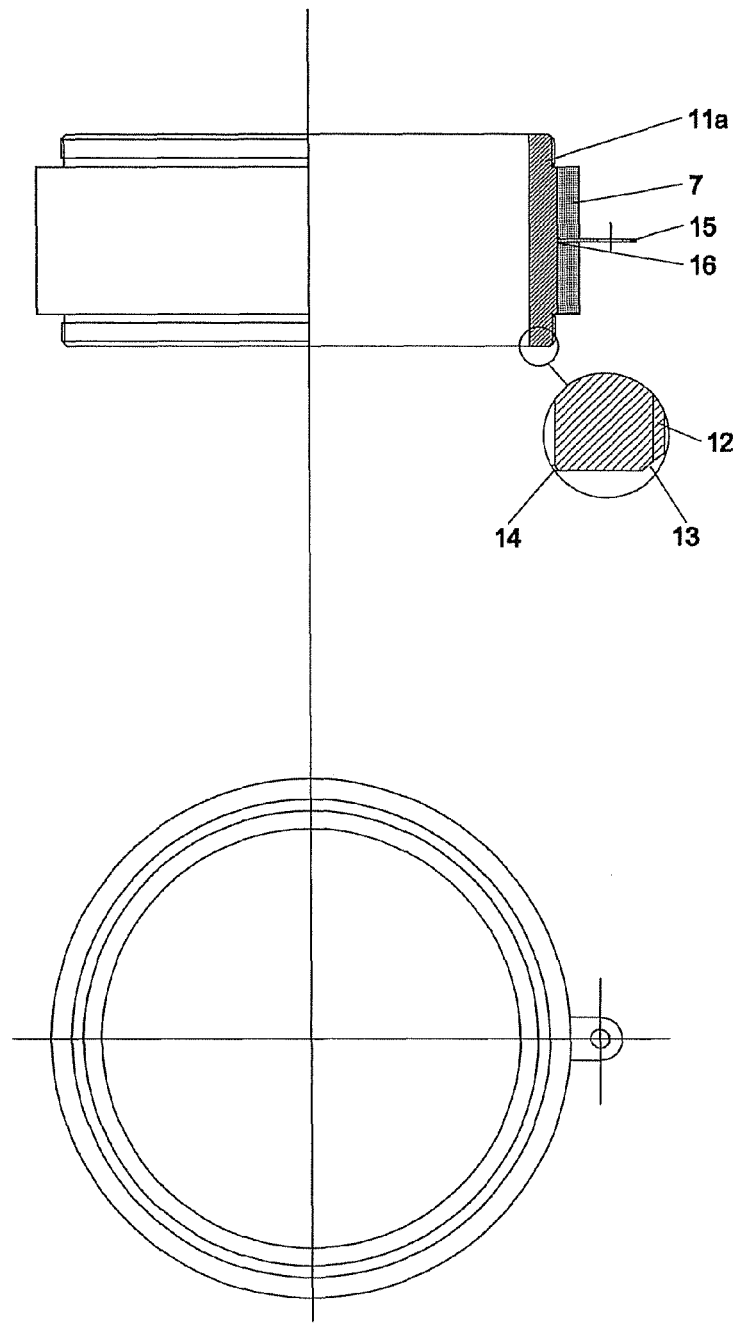
FIG. 2 represents a cylindrical assembly part of an anode.

Assembly anode 1 is made of several cylindrical parts—one top part 11$a$ (shown in FIG. 2) adjoining the output cover 6 and several parts 11$b$ connected with each other and part 11a with joining sleeves 4. The bottom part (11$b$) is adjoined with the input cover (5); the length of the part 11$a$ is less than the length of the part 11$b$ by 3-20 mm.

Parts 11$a$ and 11$b$ have the same thread 12 at the end, external bevels 13 and internal bevels 14. Internal and abutting surfaces of the parts 11$a$ and 11$b$ are covered with the protective layer (not shown here). The external cylindrical surface is equipped with an electrical and hydro isolation protective cover 7. In one embodiment, the protective cover 7 is provided with a visually recognizable color, such as red. The color red helps to avoid assembly mistakes of the manufacturing personnel as it attracts attention to the fact that parts 11$a$ and 11$b$ must be commuted only with the positive terminal of the power source. Each part 11$a$ and 11$b$ has a terminal 15 connected to the part with a weld joint 16. Terminals 15 and the parts 11a and 11b are made from the same material. The size of terminals and the width of the weld joint provide for additional safety of the electrolytic cell as they serve to minimize the warming-up in the operation mode: Δt°<35° with the current on the terminal of up to 250 A. Internal bevels 14 improve reliability as they eliminate sharp edges that are most susceptible to electrochemical corrosion. External bevels 13 provide for sealing of the ends with round gasket rings 10. Each part 11a and 11b can serve as an independent anode for the respective electrolytic cell. n parts 11a and 11b of the anode are connected together in axial alignment along the longitudinal axis of the electrolytic cell with (n-1) threaded sleeves 4. The number of parts (n) depends on the technical tasks. Examples of use in practice includes parts 11a of anodes with diameters of 60, 86 and 108 mm, lengths of 100, 120, 150, 200 and 260 mm and corresponding to parts 11b. Anodes 1 of the maximum size are made of three parts 11b with the length of 265 mm and diameter of 108 mm, one part (11a) with the length 260 mm and three joining sleeves 4; this anode is designed for the electrolytic cell of 860 g/h performance.

Figure 3:
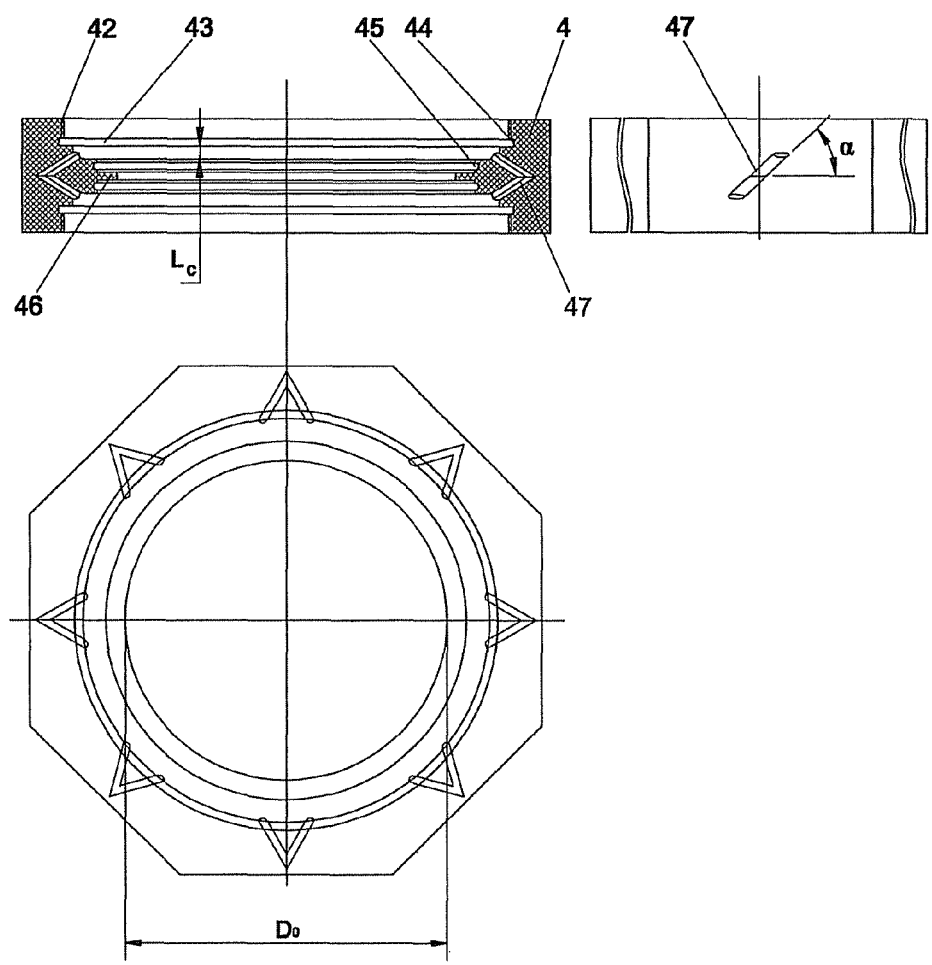
FIG. 3 represents a sleeve.

The sleeve 4 on FIG. 3 is made from a single block of acid and alkali-proof material that improves the reliability of the electrolytic cell. Sleeve 4 has the following elements on both of its sides: two threads 42, two recesses 43, two cylindrical surfaces 44, and two recesses 45. In the middle of the sleeve's 4 length there is a generally planar wall 46 positioned perpendicularly to the sleeve's longitudinal axis. Sleeve's 4 wall 46 has a round aperture made in it:

$$D_{dv} \leq D_o < D_{dn}, \text{ wherein}$$

$D_o$ is the diameter of the aperture in the wall 46,
$D_{dn}$ is the external diameter of the diaphragm,
$D_{dv}$ is the internal diameter of the diaphragm.

Cylindrical surfaces 44 of sleeve 4 are connected by channels 47 curved in the middle. Longitudinal axis of channels 47 is placed in the anode chamber spiralwise at an angle of 20°<α<70° to the surface of the electrolytic cell cross-section. The number of channels and the area of their cross-section correlate with the area of the electrolyte input cross-section area according to the following formula:

$$ns \geq 2S, \text{ wherein}$$

n is the number of channels 47,
s is the area of one channel's cross-section 47,
S is the smallest area of one electrolyte input channel 53 cross-section.

Channel 47 apertures are evenly distributed on the surface 44.

For getting a better overview, on the right side upper projection of FIG. 3 the angle α is represented only for one of n channels 47.

Diameter and cylindrical thread pitch 42 of sleeve 4 is equal to diameter and external cylindrical thread pitch 12 of the anode 1 parts 11. Recess 43 diameter is bigger than thread 42 diameter by 1-6 mm depending on the size of electrolytic cell. Size of recess 45 provides for placement of gasket rings 20, recess 45 diameter is bigger than constructive diameter of the diaphragm by 1-6 mm.

Length $L_c$ of cylindrical surface 44 provides for the proper construction of channels 47 and is selected on the basis of the following formula:

$$1.0 D_{va} \leq L_c \leq 3.0 D_{va}, \text{ wherein}$$

$D_{va}$ is diameter of anode chamber input channel.

Figure 4:
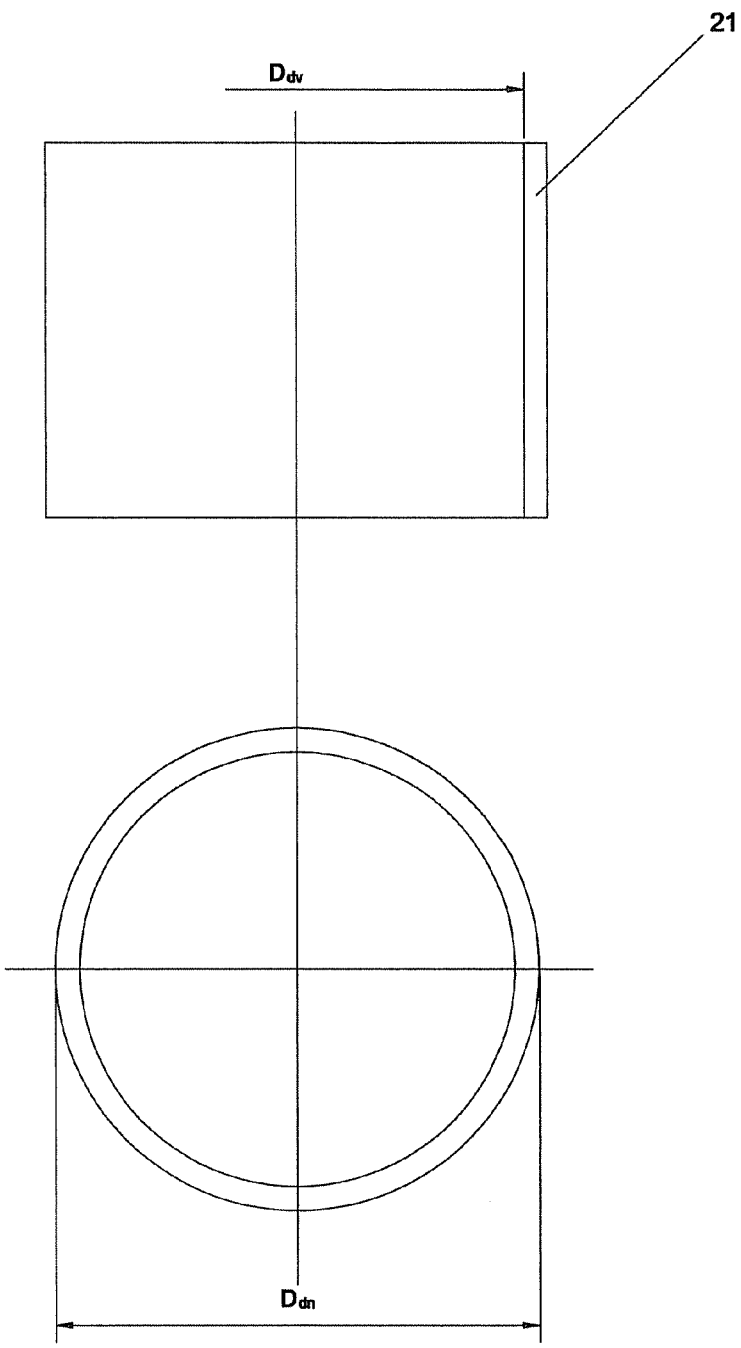
FIG. 4 represents a cylindrical assembly part of a diaphragm.

Assembled diaphragm 2 is made of several cylindrical parts 21 shown in FIG. 4. Parts 21 have the same external and internal diameters at all their length that are different from the constructive diameter by the size of manufacture tolerance ΔD. Parts 21 are assembled into the diaphragm 2 in axial alignment by using sleeves 4 and gasket rings 20. Lengths of all parts 21 are generally the same.

Figure 5:
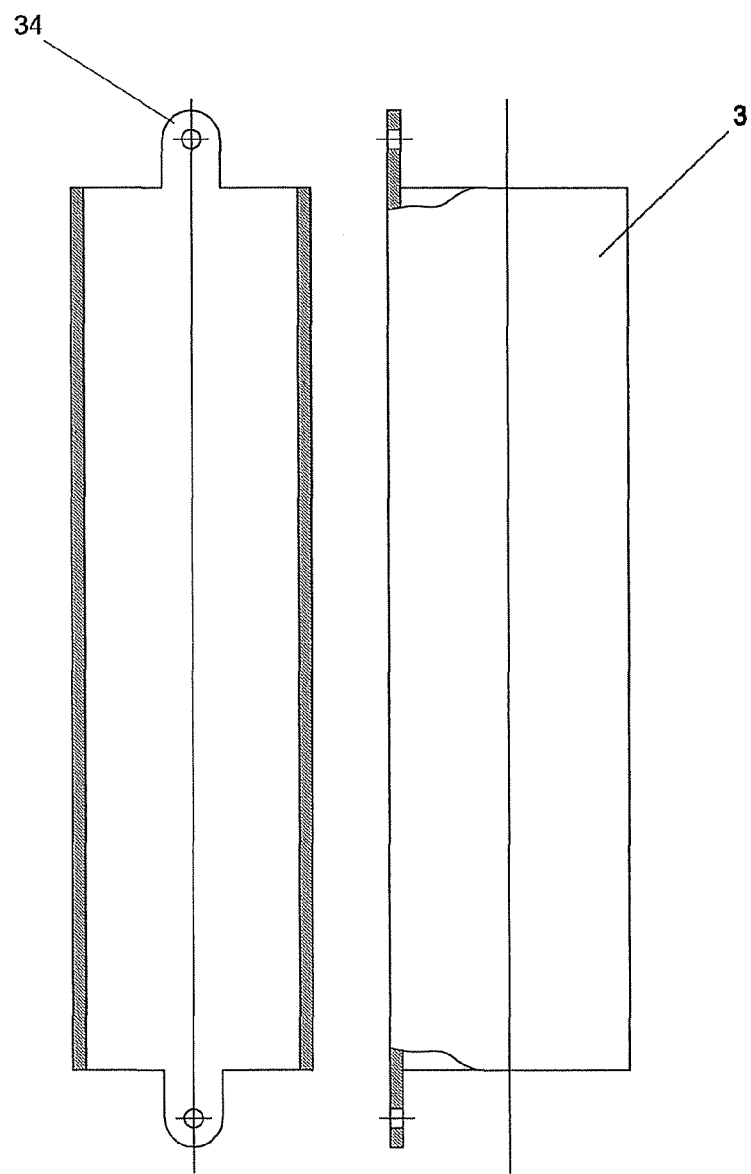
FIG. 5 represents a cathode.

FIG. 5 represents the cathode 3. Cathode 3 and terminals 34 are made from a single tube stock, which makes its manufacture and electrolytic cell assembly simpler. Contact surface 35 of terminals is made flat in order to reduce electric resistance of connection to a power supply.

Figure 6:
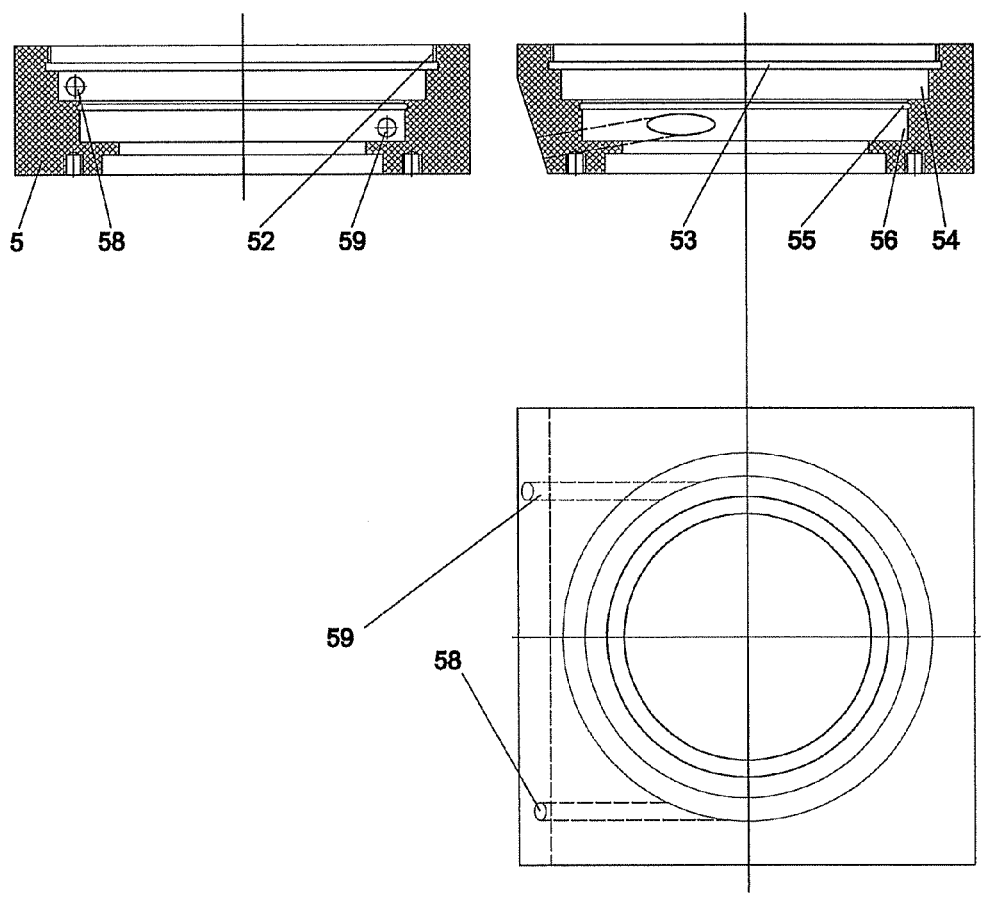
FIG. 6 represents a cover.

FIG. 6 represents the cover 5. Electrolyte input cover 5 is solid, is made from a single block of acid and alkali-proof material and is characterized by the following: thread 52, recess 53 for the gasket ring 10, recess 55 for the gasket ring 20, through aperture for placing the cathode 3, four closed thread apertures for screws 33, channel 58 for connecting anode chamber with the environment, channel 59 for connecting cathode chamber with the environment, supplementary container 54 for electrolyte input in the anode chamber, supplementary container 56 for electrolyte input in the cathode chamber.

Figure 7:
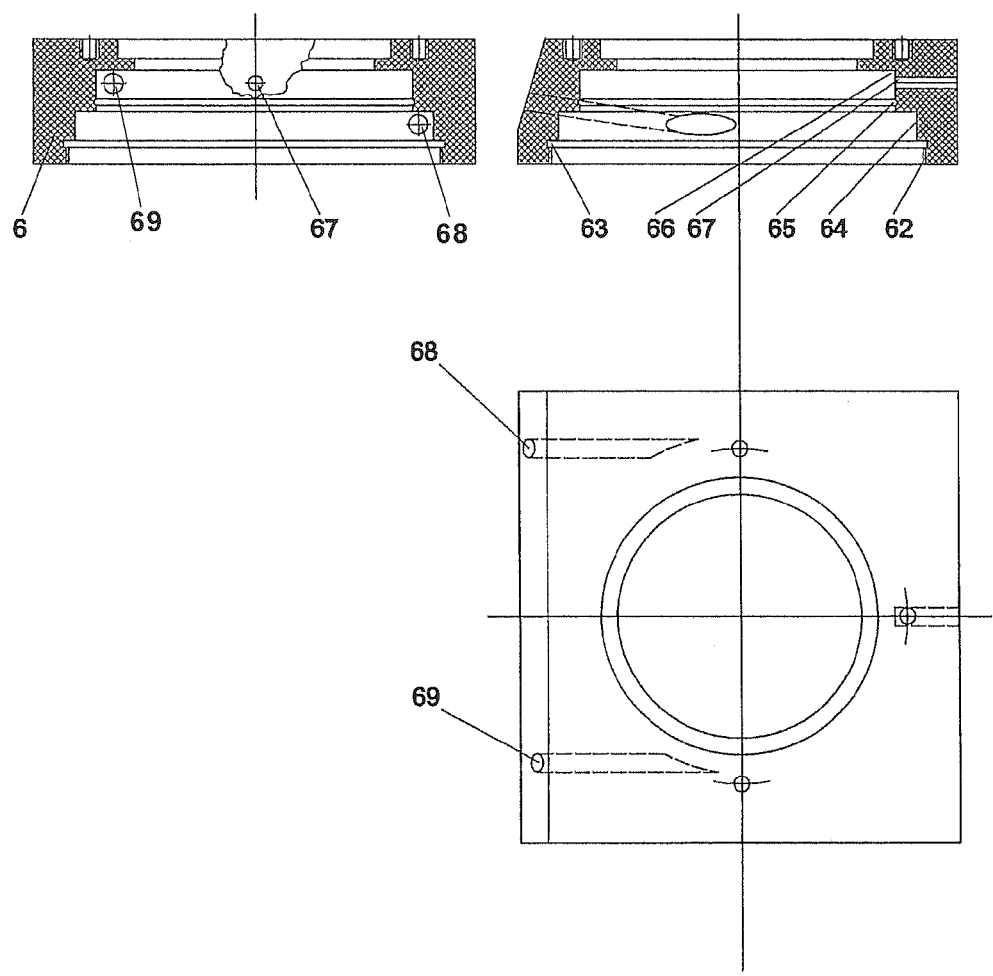
FIG. 7 represents an electrolysis products output cover.

FIG. 7 represents the electrolysis products output cover 6. The output cover 6 is solid made from a single block of acid and alkali-proof material and is comprises the following: a thread 62, a recess 63 for the gasket ring 10, supplementary anode chamber container 64 for such amount of anolyte that would completely cover part 11a of the anode during the electrolysis products output through channel 68 that connects the anode chamber with the environment, recess 65 for the gasket ring 20, through aperture for placing the cathode 3, four closed thread apertures for screws 33, a supplementary container 66 of the cathode chamber connected to the environment by catholyte output channel 69 and a cathode gases output channel 67 with an adjustable catholyte part.

Threads 42, 52 and 62, recesses 43, 53 and 63 as well as recesses 45, 55 and 65 are of equal size. Diameter of supplementary chambers 54 and 64 is smaller than diameter of the internal surface of the anode by 0.6 mm so that it is possible to create an end anode seal with a rectangular gasket ring. Diameter of containers 56 and 66 is bigger than the external constructive diameter of the diaphragm by 3-10 mm, in order to simplify assembly of the electrolytic cell. Length of container 56 is 1.0-1.5 of channel's 59 diameter. Length of container 66 is 1.0-3.0 of the channel's 69 diameter. Channel 58 is round in cross-section and is directed in a tangential manner towards the circle of the chamber's 54 cross-section, the aperture in the cylindrical surface of chamber 54 is removed as far as possible from recess 53, the angle of channel's 58 incline towards the base of cover 5 is from 0 to 45° in order to reduce hydraulic resistance of the electrolyte flow. Channel 59 has a round cross-section and is directed in parallel with channel 58 and in a tangential manner towards the circle of chamber 56. Channel 59 and 58 apertures are located on the opposite edges of the same side of cover. Channel 59 aperture in chamber 56 is placed as close as possible to recess 55. Channel 68 is round in cross-section and is directed in a tangential manner towards the circle of the chamber's 64 cross-section, the aperture in the cylindrical surface of chamber 64 is removed as far as possible from recess 63, the angle of channel's 68 incline towards the base of cover 5 is from 0 to 45°. Channel 69 has a round cross-section and is directed in parallel with channel 68 and in a tangential manner towards the circle of chamber 66. Aperture 69 in chamber 66 is placed as close as possible to recess 65. Channel 69 and 68 apertures are located on the opposite edges of the same side of cover.

Channel 67 connects container 66 with aperture on the same side of the cover where apertures of channels 69 and 68 are located. Channel 67 aperture leading to container 66 is located as far as possible from recess 65. Gasket rings 10, 20 and 30 are to seal electrode chambers and the electrolytic cell as a whole and operate in contact with ionized products of electrolysis; this is why they are manufactured from the acid and alkali-proof rubber. Sizes of rings 10, 20 and 30 are selected according to standard rules.

Flanges 32 employ their flatted cone neck to pinch rings 30 and safely seal the joint between covers 5, 6 and anode 3.

Screws 33 are standard screws, and are used for attaching flange 32 to the cover and to reinforce the cone surface.

Threads 12 of parts 11 of anode 1, threads 42 of joining sleeves 4, threads (52) and 62 of the covers 5 and 6 are axially aligned with the total deviation from the longitudinal axis of electrolytic cell of no more than 2.0 mm per 1 m of length of electrolytic cell. Recesses 43, 53 and 63 are axially aligned with the total deviation from the longitudinal axis of electrolytic cell of no more than 2.0 mm per 1 m of length of electrolytic cell.

The electrolytic cell disclosed herein operates as follows:

Electrolyte enters the electrolytic cell via channels 58 and 59 in input cover 5. Channel 59 brings electrolyte into supplementary container 56, then to the cathode chamber and then into supplementary container 66 in cover 6. From there gases are removed via channel 67 while catholyte is removed via channel 69 and its regulated part—via channel 67. From channel 58 electrolyte is removed into supplementary container 54 in input cover 5 and then to the anode chamber, flowing through channels 47 in sleeves 4 to supplementary container 64 in output cover 6. Anode is fully emerged in anolyte and gases are accumulated in the upper part of supplementary container 64. Then anolyte and gases leave electrolytic cell via channel 68 in output cover 6. Electrolytic cell is supplied with electrical power through terminals 15 of the anode and terminals 34 of the cathode.

We claim:

1. A cylindrical membranous electrolytic cell comprises:
a coaxial anode, a diaphragm and a cathode,
wherein the anode serves as an external electrode while the cathode serves as an internal electrode, and
wherein the anode and the diaphragm are assembled from cylindrical parts in axial alignment by cooperating sleeves;
wherein placement of the anode, diaphragm and cathode is defined by their respective mounting in covers that are also used for electrolyte input and output of electrolysis products, for isolating an anode chamber from a cathode chamber and sealing the electrolytic cell as a whole;
wherein the cathode with terminals is solid;
wherein the number of cylindrical parts of the diaphragm is equal to the number of cylindrical parts of the anode;
wherein the number of cooperating sleeves is less than the number of cylindrical parts of the anode by one;
wherein each cylindrical part of the anode has at least one terminal; and
wherein the cathode has at least two terminals, at least one terminal positioned on each side of the cathode.

2. The electrolytic cell accordingly to claim 1, wherein the assembled anode comprises the following parts: one top cylindrical part adjoining the output cover and a plurality of linear cylindrical parts.

3. The electrolytic cell accordingly to claim 1, wherein the number of cylindrical parts of the anode is more than one and is equal to the number of cylindrical parts of the diaphragm.

4. The electrolytic cell accordingly to claim 1, wherein an external surface of the anode is colored to serve as a visual indicator to indicate a positive electrode of a DC power supply.

5. The electrolytic cell accordingly to claim 1, wherein the cylindrical parts of the diaphragm are similar.

6. The electrolytic cell accordingly to claim 1, wherein changes in performance of the electrolytic cell are achieved by using different number of identical sets that each comprise the linear anode part, the diaphragm part, the sleeve, and by using the cathode of a predetermined length.

7. The electrolytic cell accordingly to claim 1, wherein the sleeves fix parts of the anode and the diaphragm in a coaxial manner, provide for fixation of adjoining parts of the diaphragm in a coaxial alignment, isolate the anode and the cathode chambers from one another in a joint location of parts of the diaphragm, isolate the anode chamber from the environment in a joint location of parts of the anode, and wherein the sleeves have internal channels for uninterruptible flow of electrolyte in the anode chamber, have internal transversal walls to facilitate assembly and fixing of parts of the diaphragm.

8. The electrolytic cell accordingly to claim 1, wherein a bottom part of the assembled anode and diaphragm and a bottom part of the solid cathode are fixed in a coaxial manner in the solid electrolyte input cover.

9. The electrolytic cell accordingly to claim 1, wherein a top part of the assembled anode and diaphragm together with a top part of the solid cathode are fixed in a coaxial manner in the solid electrolysis products output cover.

10. The electrolytic cell accordingly to claim 2, the top and any of the linear cylindrical parts of the anode are distinct only by the length of the cylindrical part and have similar bevels and threads on their respective ends.

11. The electrolytic cell accordingly to claim 2, wherein the cylindrical parts of the anode have a protective cover on active surfaces thereof, on an internal cylindrical surface and on abutting surfaces.

12. The electrolytic cell accordingly to claim 2, wherein the cylindrical parts of the anode have an external electrical and hydro isolation cover.

13. The electrolytic cell accordingly to claim 2, wherein a width of an anode terminal's weld joint provides for minimum electric resistance and warming-up of the terminal in operation mode by no more than 35 C.

14. The electrolytic cell accordingly to claim 10, wherein the length of the top cylindrical part of the anode is less than the length of the linear cylindrical part of the anode.

15. The electrolytic cell accordingly to claim 6, wherein the input/output covers and sleeves have similar thread and similar recesses for placing anode gasket rings.

16. The electrolytic cell accordingly to claim 6, wherein the input/output covers and sleeves have recesses of similar size for placing diaphragm gasket rings.

17. The electrolytic cell accordingly to claim 7, wherein in the middle of the sleeve's length there is a transverse wall with an axial round aperture of:

$$D_{dv} \leq D_o < D_{dn}, \text{ wherein}$$

$D_o$ is the diameter of the aperture in the transverse wall,
$D_{dn}$ is the external diameter of the diaphragm, and
$D_{dv}$ is the internal diameter of the diaphragm.

18. The electrolytic cell accordingly to claim 7, wherein the length of symmetrical cylindrical surfaces of supplementary containers of the sleeve is equal to the length of a cylindrical part of a supplementary container of the input cover.

19. The electrolytic cell accordingly to claim 7, wherein the sleeve has curved channels inside thereof that connect supplementary containers of sleeves.

20. The electrolytic cell accordingly to claim 19, wherein the channels are inclined towards cross-section's tangent of the sleeve's supplementary container by up to 75° and towards the cross-section of the sleeve's supplementary container by up to 70°.

21. The electrolytic cell accordingly to claim 19, wherein the number of sleeve's channels is selected according to the formula:

$ns \geq 2S$, wherein n is the number of channels in a sleeve,
s is the area of cross-section of one channel, and
S is the area of cross-section of anode chamber input channel.

22. The electrolytic cell accordingly to claim 19, wherein apertures of connecting channels are evenly distributed on a surface of the sleeve's supplementary containers.

23. The electrolytic cell accordingly to claim 8, wherein the input cover contains supplementary containers for providing the optimal flow of removed electrolytes.

24. The electrolytic cell accordingly to claim 8, wherein an anode chamber input channel in the input cover is parallel to a cathode chamber input channel and the channels lead from an outside of one side of the electrolytic cell to different sides of a supplementary container's cross-section diameter.

25. The electrolytic cell accordingly to claim 9, wherein the output cover contains a supplementary container anolyte that fully closes the anode and a supplementary container for accumulating and removing gases from the cathode chamber.

26. The electrolytic cell accordingly to claim 25, wherein there is an anolyte removal channel aperture in the supplementary anolyte container, said aperture is positioned as far as possible from an anode gasket ring recess.

27. The electrolytic cell accordingly to claim 25, wherein the supplementary container for cathode chamber gases has an aperture for catholyte output, and the center of the aperture is located as close as possible to an anode gasket ring recess.

28. The electrolytic cell accordingly to claim 25, wherein the supplementary container for the cathode chamber gases has an aperture for output gases and a regulated part of the catholyte, and a center of the aperture is located as far as possible from a diaphragm gasket ring recess.

29. The electrolytic cell accordingly to claim 9, wherein the output cover contains parallel channels for anolyte and catholyte removal leading to the same side of the output cover, perpendicularly to different sides of a supplementary container's cross-section.

30. The electrolytic cell accordingly to claim 29, wherein the anolyte and catholyte removal channels are located perpendicularly to such sides of the diameter of the supplementary container, that the anolyte output channel continues the direction of the anolyte sprialwise movement and the catholyte output channel continues the direction of the catholyte sprialwise movement.

31. The electrolytic cell accordingly to claim 9, wherein the output cover has a channel for removal of gases and a regulated part of the catholyte that is located radially and in parallel to the anolyte and catholyte output channels.

* * * * *